(12) United States Patent
Siemers (10) Patent No.: US 10,919,176 B2
(45) Date of Patent: Feb. 16, 2021

(54) PROCESS FOR MANUFACTURING WALL ELEMENTS FROM NAILABLE AND/OR STAPLEABLE MATERIALS

(71) Applicant: Raimund Beck Nageltechnik GmbH, Mauerkirchen (AT)

(72) Inventor: Stefan Siemers, Burghausen (DE)

(73) Assignee: Raimund Beck Nageltechnik GmbH, Mauerkirchen (AT)

( * ) Notice: Subject to any disclaimer, the term of this patent is extended or adjusted under 35 U.S.C. 154(b) by 166 days.

(21) Appl. No.: 16/251,786

(22) Filed: Jan. 18, 2019

(65) Prior Publication Data
US 2019/0224881 A1 Jul. 25, 2019

(30) Foreign Application Priority Data

Jan. 19, 2018 (DE) .......................... 102018000415.6

(51) Int. Cl.
| | | |
|---|---|---|
| *B27F 7/00* | (2006.01) | |
| *B27M 3/00* | (2006.01) | |
| *B27C 5/00* | (2006.01) | |
| *B25J 15/00* | (2006.01) | |
| *B23Q 17/24* | (2006.01) | |
| *B23Q 9/00* | (2006.01) | |
| *E04C 2/38* | (2006.01) | |

(Continued)

(52) U.S. Cl.
CPC ............ *B27F 7/006* (2013.01); *B23Q 9/0007* (2013.01); *B23Q 17/24* (2013.01); *B25J 15/0019* (2013.01); *B27C 5/00* (2013.01); *B27M 3/0073* (2013.01); *E04B 2/70* (2013.01); *E04C 2/12* (2013.01); *E04C 2/386* (2013.01)

(58) Field of Classification Search
CPC .......... B27F 7/006; B25J 15/0019; B25J 5/00; B25J 11/005; B23Q 17/24; B23Q 9/0007; B27C 5/00; B27C 5/06; E04C 2/386; E04C 2/12; E04B 2/70; B27M 3/006; B27M 3/002; B27M 3/0073
See application file for complete search history.

(56) References Cited

U.S. PATENT DOCUMENTS 9,555,545 B2 * 1/2017 Linnell .................. B25J 9/1666

FOREIGN PATENT DOCUMENTS

| DE | 19820783 A1 | 9/1999 |
| DE | 10224912 A1 | 12/2003 |
| WO | WO2012048793 A1 | 4/2012 |

OTHER PUBLICATIONS

Examination Report—dated Oct. 5, 2018—DE102018000415.6.

* cited by examiner

*Primary Examiner* — John C Hong
(74) *Attorney, Agent, or Firm* — Berenato & White, LLC

(57) ABSTRACT

A process for manufacturing wall elements from nailable and/or stapleable materials, in which a wall element frame is positioned on a horizontal worktable. Wall panels are placed on the frame and the wall panels are fastened to the frame by nails and/or staples, which are driven by a compressed air setting device. A mobile robot—in particular an autonomous mobile robot—has a compressed air setting device and/or at least one milling unit and is movable on the surface formed by the wall panels. The robot motion is automatically controlled along the surface formed by the wall panels. At predetermined positions, the milling unit and/or the compressed air setting device is actuated to process the wall panels and/or to fasten them to the wall element frame.

18 Claims, 5 Drawing Sheets

(51) Int. Cl.
*E04C 2/12* (2006.01)
*E04B 2/70* (2006.01)

Fig. 5

PROCESS FOR MANUFACTURING WALL ELEMENTS FROM NAILABLE AND/OR STAPLEABLE MATERIALS

CROSS-REFERENCE TO RELATED APPLICATIONS AND CLAIM TO PRIORITY

This application is related to Patent Application No. 102018000415.6 filed Jan. 19, 2018 in the Federal Republic of Germany, the disclosure of which is incorporated herein by reference and to which priority is claimed.

FIELD OF THE INVENTION

The present invention relates to a process for manufacturing wall elements from nailable and/or stapleable materials, in particular wood or wood composite materials in which
a wall element frame is positioned on a horizontal worktable,
wall panels can be placed on the wall element frame and
the wall panels are fastened to the wall element frame by nails and/or staples, which are driven in by means of a compressed air setting device.

Furthermore, this invention relates to a processing device for manufacturing wall elements from nailable and/or stapleable materials.

BACKGROUND OF THE INVENTION

In industrial prefabricated house construction, entire wooden house walls are assembled in a factory hall. The individual walls or wall elements each consist of solid wooden stands, which are planked on both sides with panel material. For assembly, wooden stands are placed on a horizontal worktable according to the desired statics and connected to each other with nails or similar fasteners to form a wall element frame. In a second work step, the wall element frame created in this way, in the form of a lattice construction, is covered with wall panels. The wall panels are joined to the wall element frame to form a shear-resistant bond by staples or nails using compressed air setting tools. After finishing one side, the wall is turned upside down and the other side is covered in the same way.

The assembly process is carried out by hand or, in the case of larger industrial companies, by means of a portal system or jointed-arm robot. The portal system or the jointed-arm robot mainly takes over the time-consuming work of setting staples of nails.

Investments in a portal system or in an articulated arm robot only pay off for an industrial company with a certain number of houses or wall elements to be produced each year. Small and medium-sized companies in particular shy away from investing in this technology because the payback period is too long due to the small number of construction projects.

Furthermore, the installation of a portal system or an articulated arm robot is usually associated with longer downtimes in wall mounting. In addition, the installation of the guide rails for a portal system requires a good industrial floor in the floor area, which often does not exist.

SUMMARY OF THE INVENTION

The task of the present invention is therefore to specify a method for manufacturing wall elements from nailable and/ or stapleable materials of the type mentioned above, as well as a processing device for carrying out the method, which enables the automated manufacture of wall elements with little effort.

This task is solved in a process of the type mentioned above in that a mobile robot—in particular an autonomous mobile robot—carrying at least one compressed air setting device and/or at least one milling unit, is freely movably positioned on the surface formed by the wall panels in contact with the latter, and the robot is moved automatically controlled by a central controller along the surface formed by the wall panels and the at least one milling unit and/or the at least one compressed air setting device is actuated automatically controlled by the controller at predetermined positions in order to process the wall panels and/or fasten them to the wall element frame.

Correspondingly, the processing device in accordance with the invention for manufacturing wall elements from nailable and/or stapleable materials, which is particularly suitable for carrying out the process in accordance with the invention, is also characterized by
a horizontal worktable on which a wall element frame of a wall element to be manufactured can be positioned lying,
a mobile—in particular autonomous—robot which carries at least one compressed-air setting device and/or at least one milling unit,
an optical detection device adapted to detect the position and/or the shape of the wall element frame, and
a central controller which is coupled to the optical detection device, to the robot and to the compressed air setting device and/or the milling unit and which is adapted to automatically move the robot which is positioned on a surface formed by wall panels which are placed on a wall element frame positioned on the worktable, in contact therewith on the basis of data it receives from the optical detection device on the surface and to automatically actuate, at predetermined positions, the at least one milling unit and/or the at least one compressed air setting device in order to machine the wall panels and/or fasten them to a wall element frame.

The invention is thus based on the consideration of using a mobile robot for fastening the wall panels to the wall element frame and/or for processing the wall panels. For this purpose, the mobile robot carries the processing devices necessary for the work to be carried out, i.e. a compressed air setting device for driving in nails and/or staples (nail or staple gun) to fix the wall panels to the wall element frame and/or a milling unit for processing the wall panels. The robot is automatically controlled on the surface formed by the wall panels. For this purpose, the robot has an associated processor, which communicates with the central controller on the one hand and with the motor(s) of the robot as well as a steering device of the robot on the other hand, so that based on control signals of the central control the robot can be moved forward, rearward, stopped and steered. The processor is also connected with the processing devices carried by the robot, so that the processing devices can be actuated by the central control via the processor. In other words, the processing devices are guided over the wall panels to be mounted in order to nail/staple them to the wall element frame and/or to cut out window openings and/or to trim protruding panel edges at specified locations. For this an autonomous robot is used, which moves on wheels or chains over the wall panels arranged on the frame. The robot and the processing devices provided thereon are remotely controlled by a central control via the processor provided on the robot. Such an autonomous robot can be supplied with electricity and compressed air from the ceiling and equipped with the necessary processing devices, in particular a compressed air setting device and/or a milling unit.

The invention is further designed with an optical detection device which detects the positions and/or the shape of the wall element frame and transmits the corresponding data to the central controller. This data is used to control the robot as well as the processing equipment provided on it. Also, data may be stored in the controller regarding the final product to be manufactured. Specifically data regarding the outer form of the final product, the position, size and form of windows to be produced in the wall panels and the positions, where nails/staples are to be driven into the wall panels in order to fix them to the wall element frame maybe stored in the controller, so that the controller is able to control the movement of the robot as well as the processing equipment provided on the robot on the basis of the stored data and the data received by the optical detection device.

Preferably, the controller is connected to a screen on which an image of the wall element frame and its position on the worktable is displayed on the basis of the data transmitted by the optical detection device. In addition, desired positions of wall openings such as window openings can also be marked on the screen.

On the basis of the data transmitted by the optical detection device, a travel path of the robot is calculated by the controller and the robot is moved automatically controlled by the controller along the travel path. This represents a fully automatic mode of operation. It is also possible, on the basis of the data transmitted by the optical detection device, to first calculate a travel path of the robot, this travel path being displayed on the screen and a user being given the possibility to correct the travel path of the robot on the screen. In particular, a user can be given the possibility of marking a desired travel path of the robot on the screen, whereby the robot is then moved automatically controlled along the marked travel path. In this case, the screen is designed for direct data input—especially as a touchpad. The robot is then moved automatically and controlled along the corrected travel path. The controller is designed to communicate between the screen, the optical detection device and the robot and the processing equipment held thereon.

In accordance with a further embodiment of the process according to the invention, provision is made for the user to be able to determine on the screen machining positions and/or machining paths for the at least one milling unit and/or the at least one compressed air setting device, the robot and/or the milling unit and/or the at least one compressed air setting device being moved and actuated in a controlled manner in accordance with the determined machining positions and/or machining paths.

In terms of device, the processing device is correspondingly characterized in that the screen is designed for direct data input—in particular as a touchpad—and a user is given the possibility of defining machining positions and/or machining paths for the at least one milling unit and/or the at least one compressed air setting device, the controller being designed in order to move and actuate the robot and/or the milling unit and/or the at least one compressed air setting device in a controlled manner in accordance with the defined machining positions and/or machining paths.

Alternatively, the process according to the invention may be designed in such a way that, on the basis of the data transmitted by the optical detection device, the at least one milling unit and/or the at least one compressed air setting device is automatically actuated in order to fasten the wall panels and/or to fasten them to the wall element frame.

In general, for different types of wall elements, the optimum travel path, the fixing positions and also the number of nails to be driven into the respective fixing position can be stored in a database which the controller can access. Then a more or less fully automatic assembly of the wall elements is possible. The possibility of intervention by the user or operator of the processing equipment/plant in accordance with the invention can also be used to manually enter or influence the assembly for each wall element.

The optical detection device shall preferably comprise several cameras and/or laser detection devices, in particular mounted above the worktable.

With regard to further advantageous embodiments of the invention, reference is made to the subclaims and the following description of an example with reference to this drawing.

DETAILED DESCRIPTION OF THE PREFERRED EMBODIMENT(S)

FIGS. 1 to 4 show the working steps of an embodiment of the process for manufacturing wall elements from nailable and/or stapleable materials by means of a corresponding processing device in accordance with the present invention. The inventive processing device for manufacturing wall elements comprises a horizontal worktable 1 which defines a horizontal supporting surface of rectangular basic shape, positioning/location projections 2 being provided along one longitudinal side and along one transverse side of the worktable 1, projecting upwards above the working surface of the worktable 1 and serving as a positioning aid. The processing device also comprises an optical detection device 3, which here comprises two cameras which are positioned above the worktable 1 and fastened, for example, to the ceiling of a machine hall or a suitable supporting structure. The optical detection device 3 detects the position and shape of workpieces positioned on the work surface of worktable 1. The optical detection device 3 is coupled with a central controller 4 of the processing device, which is preferably a tablet PC.

To manufacture a wall element, a wall element frame 5 is first positioned on the worksurface of worktable 1 and brought into contact with the positioning projections 2 and aligned in this way. The wall element frame 5 consists of a multitude of solid wooden struts 5a, 5b, 5c . . . , also called wooden stands, which are usually nailed together. In principle, it is also possible to position the individual wooden struts 5a, 5b, 5c . . . on worktable 1 and assemble them together to form the framework shown in FIG. 2, which has the necessary rigidity and statics. The shape and position of the wall element frame 5 is recorded by the cameras of the optical detection device 3 and transmitted to the controller 4.

Figure 1:
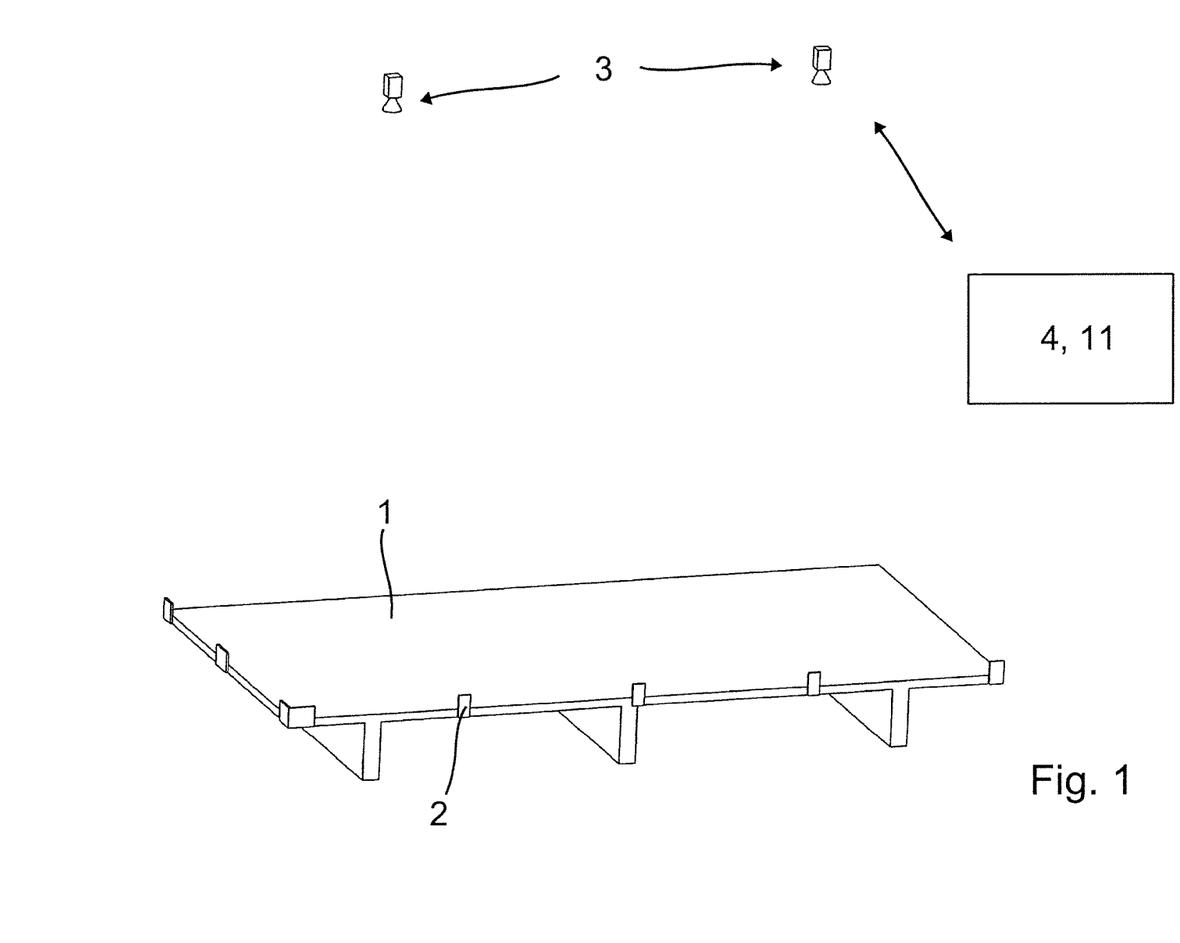
FIG. 1 is a schematic view in perspective of a worktable with associated cameras of a processing device for producing wall elements from nailable and/or stapleable materials according to the present invention in perspective view.
Figure 2:
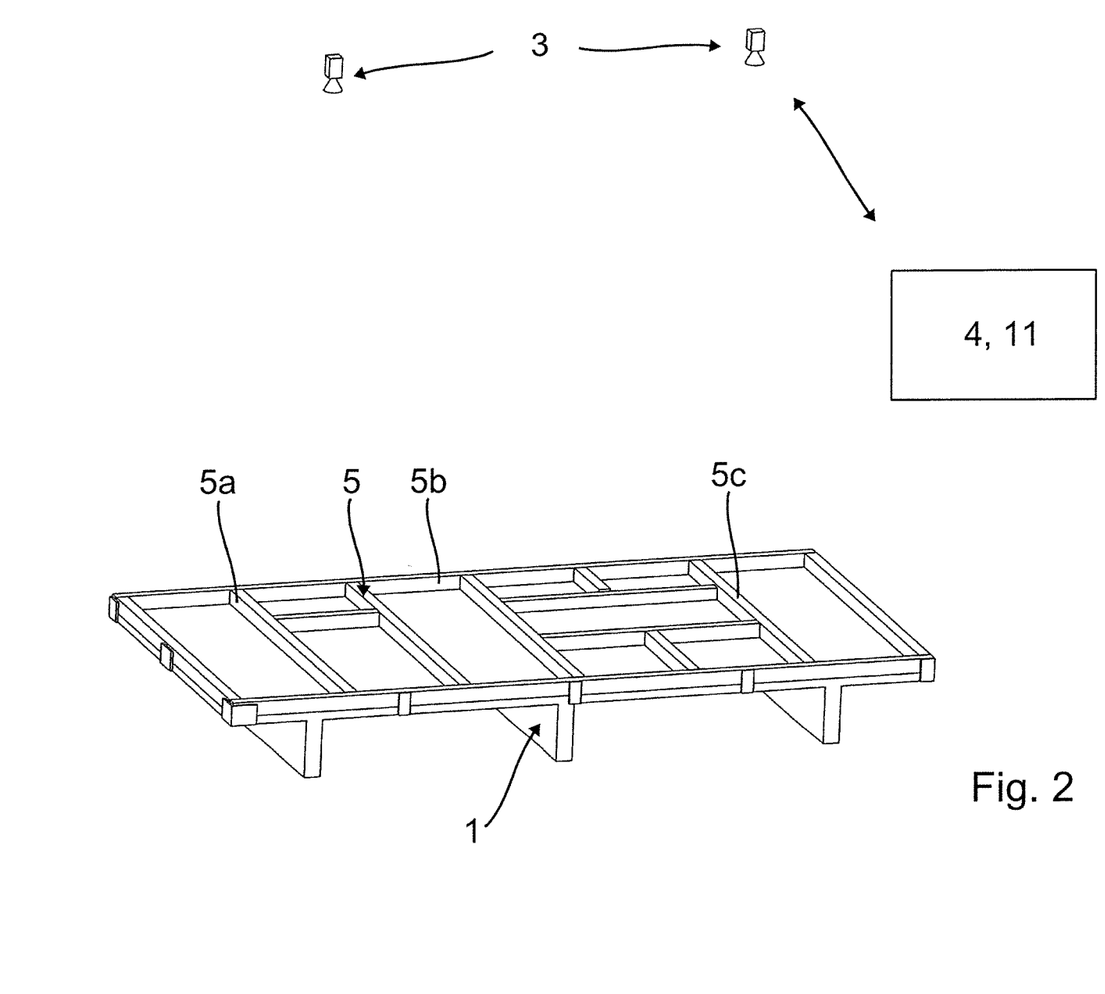
FIG. 2 is a schematic view in perspective of the arrangement of FIG. 1, wherein a wall element frame of a wall element to be produced is placed on the worktable.
Figure 3:
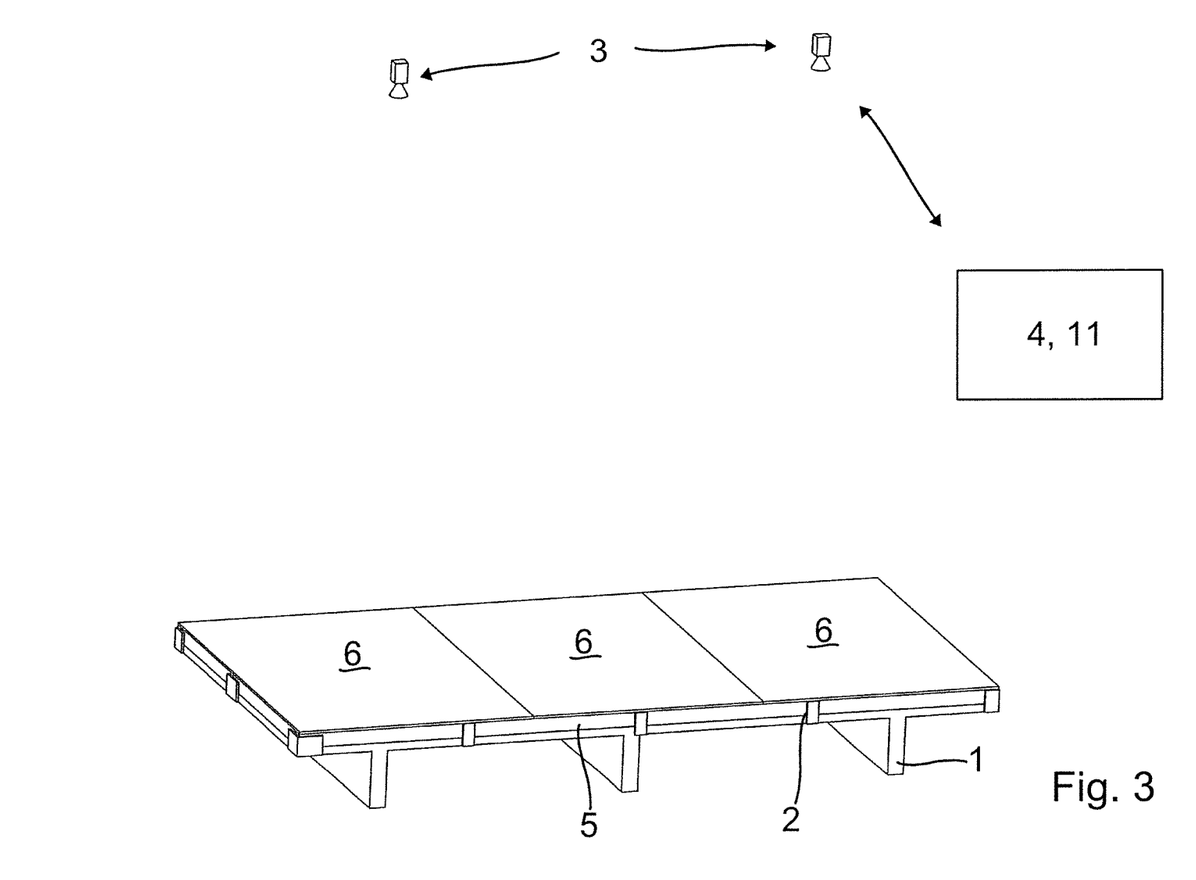
FIG. 3 is a schematic view in perspective of a view corresponding to FIG. 2, with three wall panels positioned on the wall element frame.

In a further step, the upper side of the wall element frame 5 is planked, i.e. three wall panels 6 are laid on the wall element frame 5 so that they form a closed surface.

In a further step the wall panels 6 are fastened to the wall element frame 5 by nails and/or staples, which are driven into the wall panels 6 and the wall element frame 5 by means of a compressed air setting tool. In addition, window openings can be made in the wall panels or projecting panel edges can be trimmed.

Figure 4:
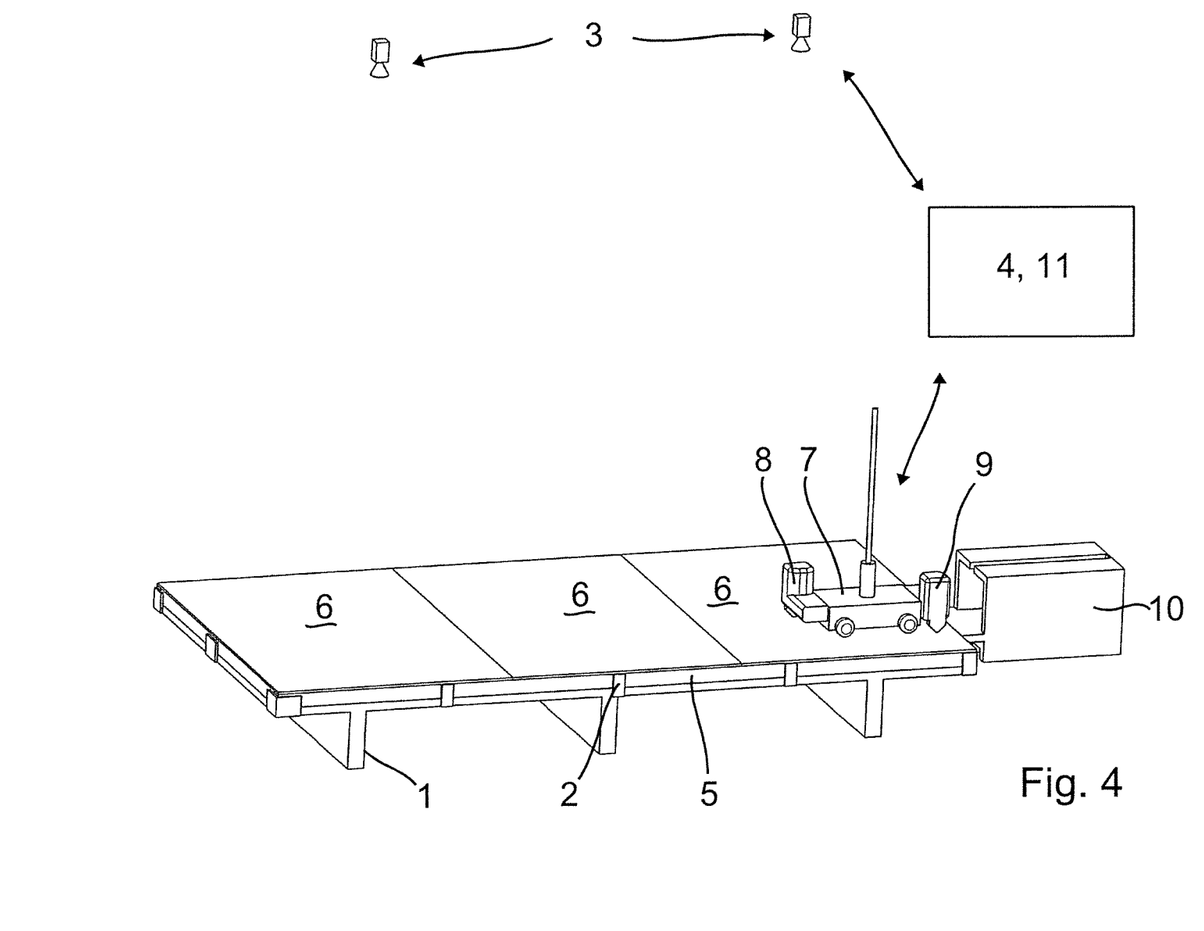
FIG. 4 is a schematic view in perspective of the arrangement of FIG. 3, with a robot being placed on the surface formed by the wall panels.

According to the invention, these work steps are carried out by a mobile autonomous robot 7, which carries the processing equipment necessary for the operations to be carried out and is automatically controlled and moved on the surface formed by the wall panels 6 in order to carry out the operations. In FIG. 4, the robot 7 is positioned on the right wall panel 6 and carries an air pressure setting device 8, with which nails or staples can be set pneumatically to fix the wall panels 6 to the wall element frame 5, and a milling unit 9, which is used to cut out window openings from the wall panels 6 or to trim protruding panel edges. On the robot 4 is provided a processor which communicates with the controller 4 in a wireless way and is connected to a motor(s) of the robot 7 as well as with the air pressure setting device 8 and the milling unit 9 in order to move the robot 7 and activate the air pressure setting device 8/the milling unit 9 on the basis of data/commands received from the controller 4.

The robot 7 is assigned an enclosure 10, which is positioned outside the worktable 1. The robot 7 returns to this enclosure 10. The enclosure 10, into which the robot 7 withdraws after work, should protect the robot 7 from dust and at the same time be the transport packaging for the robot 7 in which it is delivered.

The enclosure 10 is height-adjustable and can be positioned so that the upper side of the wall panels 6 is approximately flush with the installation surface of the enclosure 10, so that the robot 7 can easily be moved into the enclosure 10 or from the enclosure 10 onto the wall panels 6.

The enclosure 10 can be designed as a loading station for the robot 7. Alternatively, the robot 7 can receive a permanent power supply, for example from the ceiling. In particular, the power can be supplied from the ceiling together with a compressed air line to supply the compressed air setting tool 8.

Figure 5:
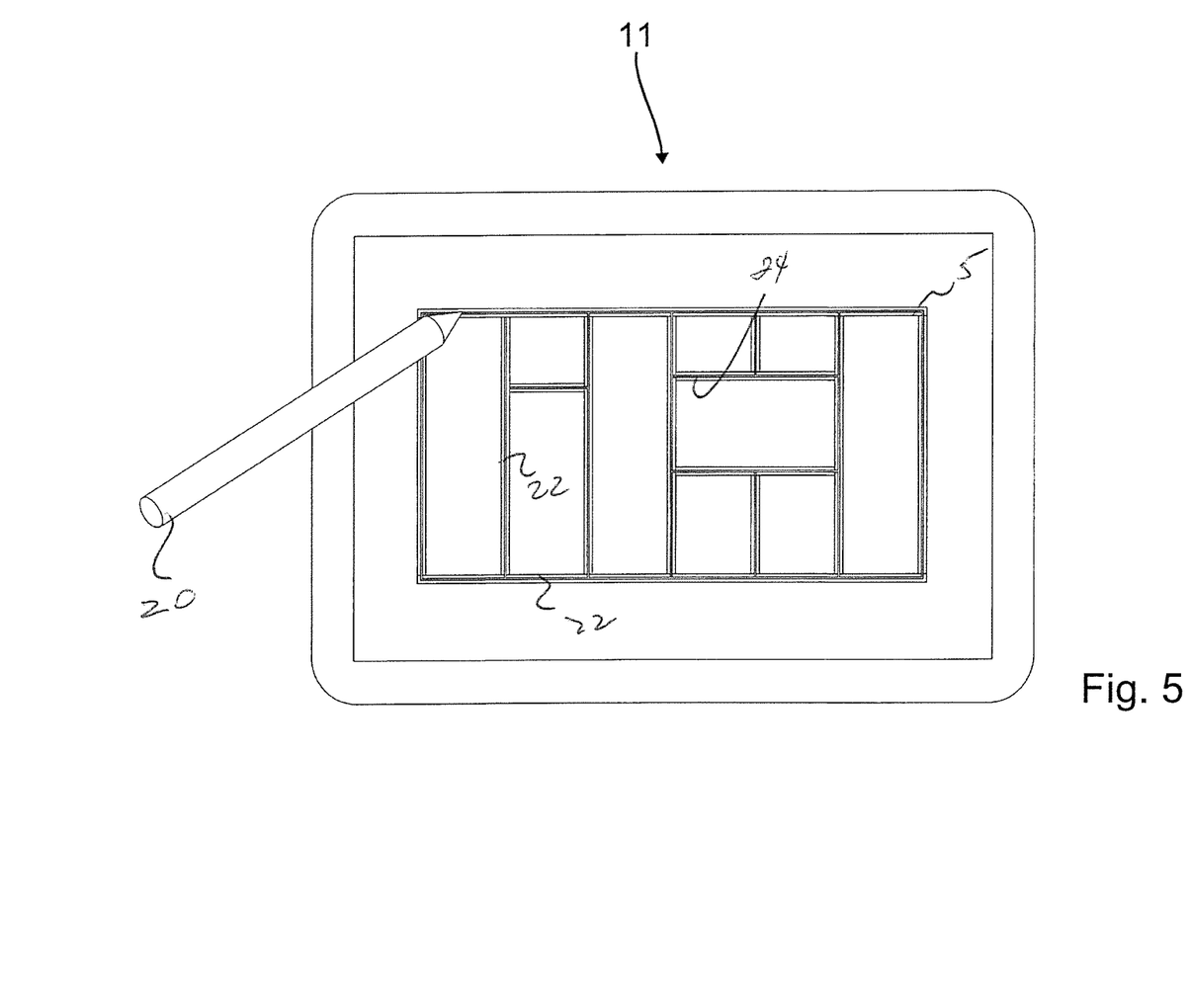
FIG. 5 illustrates a tablet PC and an input device therefor of the processing device according to the invention.

The tablet PC/controller 4 comprises a screen 11, which simultaneously functions as an input unit for the controller 4. As shown in FIG. 5, the screen 11 of the controller 4 displays an image of the wall element frame 5 as captured by the optical detection device 3. In other words, the image of the wall element frame 5, which resembles a frame work, is simulated on screen 11. At this point it is possible to influence the path of the robot 7. Machining operations and positions for the milling unit 9 or the pneumatic setting tool 8 can also be entered here.

The processing device according to the invention can be operated fully automatically. In this case, on the basis of the data received from the optical detection device 3, the controller 4 calculates the paths to be covered by the robot 7 in order to cover the entire wall element frame 5 and fix the wall panels 6 to the wall element frame 5 by means of nails or staples driven in by the air pressure setting device 8. Here it can be stored in the controller 4 at which fastening positions nails/staples must be driven into the wall panels 6 and the wall element frame 5 by the compressed air setting tool 8, i.e. the robot 7 must be stopped if necessary and the compressed air setting tool 8 must be actuated. It can also be stored along which paths the robot 7 must be guided and the milling unit 9 must be actuated in order to trim the panel edges or to make window openings in the wall panels 6.

Via screen 11, it is also possible to manually enter the travel paths for robot 7. In the same way, it is also possible to determine manually at which points a milling machining is to be carried out.

In addition, a hermaphroditic solution is possible, according to which the controller 4 suggests a travel path for the robot 7, fastening positions, etc. and the user has the possibility of manual influence.

Finally, the robot 7 is activated by the controller 4 and then moves from the loading station 10 onto the surface formed by the wall panels 6 and is moved along the paths defined by the defined travel path in order to position the milling unit 9 and the compressed air setting device 8 so that they can carry out the necessary work at the desired matching points. At these matching points, the milling unit 9/the compressed air setting device 8 are activated via the controller 4/the processor of the robot 7 to carry out the necessary work. The robot 7 is detected by the cameras of the optical detection device 3, and the robot 7 is moved in a controlled manner on the basis of the data determined by the optical detection device 3 and transmitted to the controller 4.

As best shown in FIG. 5, a stylus 20 is adapted for communication with the controller 4 though the screen 11. The tablet computer of the controller 4 and the stylus 20 are available, such as from Wacom Co., Ltd. of Japan. Illustrated on screen 11 is a wall element frame 5 formed from a plurality of interconnected wood or wood composite members 22. A window opening 24 can be seen in the wall element frame 5. The wall element frame 5 may either be shown on screen 11 because it is an image stored in memory and easily displayed on screen 11, may be drawn on screen 11 through movement of the stylus 20 on the screen 11 through use of a suitable drawing program, or may be captured by the optical device 3. The drawing program may be resident in the memory of controller 4. The computer program may, for example, be a computer aided design (CAD) program.

Once the wall frame element 5 is displayed on the display 11, the appropriate path for the robot 7 to move about the wall panels 6 may be either input through stylus 20 or calculated by the processor 4, and then transmitted to robot 7.

Once the wall frame element is displayed on the screen 11, the user may actuate another program in order to identify the boundaries of the wall frame element 5 and also the position of the interconnected members 22. Location of the interconnected members 22 allows the user to identify those members 22 that may be receive the staples or nails from the pneumatic setting tool 8. Further, location of the window opening 24 also identifies where the milling unit 9 is to operate in order to create the window opening 24. Of course, there may be multiple window openings 24, each identified through use of stylus 20. Those skilled in the art will understand that actuation of the pneumatic device 9 causes nails or staples to be driven through the panels 6 in order to secure them to the members 22, and thus to the wall frame member 5. Likewise, actuation of the milling unit 9 causes openings to be formed in the panels 6 in order to locate window opening 24 and ultimately for positioning of an appropriate window.

The invention claimed is:

1. A process for manufacturing wall elements from nailable and/or stapleable materials, the method comprising the steps of:
   positioning a wall element frame (5) of a wall element to be produced on a horizontal worktable (1);
   placing wall panels (6) on the wall element frame (5);
   providing a mobile robot (7) carrying at least one of a compressed-air setting device (8) and a milling unit (9), the mobile robot freely movably positionable on a surface formed by the wall panels (6);
   providing a central controller (4) controlling the mobile robot (7) and the at least one of the compressed-air setting device (8) and the milling unit (9);
   the wall panels (6) are to be fastened to the wall element frame (5) by nails and/or staples driven in by the compressed air setting device (8);
   the mobile robot (7) automatically moveable by the central controller (4) along the surface formed by the wall panels (6); and
   actuating automatically by the central controller at predetermined positions of the mobile robot (7), at least one of the milling unit (9) and the compressed air setting device (8) in order to process the wall panels (6) and/or to fasten the wall panels (6) to the wall element frame (5).

2. The process according to claim 1, further comprising the steps of detecting at least one of a position and a shape of the wall element frame (5) by an optical detection device (3), and transmitting data from the optical detection device (3) to the central controller (4).

3. The process according to claim 2, further comprising the steps of displaying the wall element frame (5) and the position on a screen (11) based on the data transmitted by the optical detection device (3).

4. The process according to claim 3, further comprising the steps of calculating a travel path of the mobile robot (7) on the basis of the data transmitted by the optical detection device (3), displaying on the screen (11), the travel path of the mobile robot (7) on the screen (11), and then moving the mobile robot (7) along a corrected travel path in an automatically controlled manner.

5. The process according to claim 3, further comprising the step of marking a desired travel path of the mobile robot (7) on the screen (11) and moving the mobile robot (7) along a marked travel path in an automatically controlled manner.

6. The process according to claim 3, further comprising the step of defining at least one of machining positions and machining paths for at least one of the milling unit (9) and the compressed air setting device (8) on the screen (11), and driving and actuating at least one of the mobile robot (7), the milling unit (9) and the compressed air setting device (8) in a controlled manner in accordance with at least one of defined machining positions and defined machining paths.

7. The process according to claim 3, wherein a travel path of the mobile robot (7) is calculated based on the data transmitted by the optical detection device (3), and wherein the mobile robot (7) is moved in an automatically controlled manner along the travel path.

8. The process according to claim 2, further comprising the steps of calculating a travel path of the mobile robot (7) by the central controller (4) based on the data transmitted by the optical detection device (3), and moving the mobile robot (7) in an automatically controlled manner by the central controller (4) along the travel path.

9. The process according to claim 2, wherein the at least one of the milling unit (9) and the compressed air setting device (8) is automatically actuated based on the data transmitted by the optical detection device (3) in order to machine the wall panels (6) and/or to fasten the wall panels (6) to the wall element frame (5).

10. The process according to claim 1, wherein an optical detection device (3) is used, and wherein the optical detection device (3) comprises a plurality of cameras and/or laser detection devices.

11. The process according to claim 1, wherein the wall element frame (5) is provided with the wall panels (6) on both sides, wherein the wall element frame (5) is turned, after the wall panels have been fitted on one side of the wall element frame (5), and covered with the wall panels (6) on an open side of the wall element frame (5), the wall panels (6) are finally fixed and/or machined on the wall element frame (5) by the automatically controlled mobile robot (7) and at least one of the compressed air setting device (8) and the milling unit (9) on the wall element frame (5).

12. A processing device for manufacturing of wall elements from nailable and/or stapleable materials according to a process according to claim 1, the processing device comprising:
    a horizontal worktable (1) for supporting a wall element frame (5) of one of the wall elements;
    a mobile robot (7) carrying at least one of a compressed-air setting device (8) and a milling unit (9);
    an optical detection device (3) adapted to detect at least one of a position and a shape of the wall element frame (5); and
    a central controller (4) coupled to the optical detection device (3), to the mobile robot (7) and to at least one of the compressed air setting device (8) and the milling unit (9) the central controller (4) configured to automatically move the mobile robot (7), positioned on a surface formed by wall panels (6), which are placed on the wall element frame (5) positioned on the worktable (1) in contact therewith, based on data received from the optical detection device (3) and to automatically actuate at least one of the milling unit (9) and the pneumatic setting device (8) at predetermined positions in order to machine the wall panels (6) and/or fasten the wall panels (6) to the wall element frame (5).

13. The processing device according to claim 12, further comprising a screen (11) displaying an image of the wall element frame (5) and a position thereof on the worktable (1) based on the data transmitted by the optical detection device (3).

14. The processing device according to claim 13, wherein the central controller (4) is configured to calculate a travel path for the mobile robot (7) based on the data transmitted by the optical detection device (3) and to automatically move the mobile robot (7) along the travel path.

15. The processing device according to claim 14, wherein the screen (11) is configured for direct data input, wherein a desired travel path of the mobile robot (7) is markable on the screen (11), and wherein the central controller (4) is configured to move the mobile robot (7) automatically in a controlled manner along a marked travel path.

16. The processing device according to claim 13, wherein the central controller (4) is configured to calculate a travel path for the mobile robot (7) based on the data obtained from the optical detection device (3) and to display the travel path on the screen (11), wherein the travel path of the mobile robot (7) is manually correctable, and wherein the central controller is configured to move the robot (7) automatically in a controlled manner along a corrected travel path.

17. The processing device according to claim 13, wherein the screen (11) is configured for direct data input, wherein at least one of machining positions and machining paths for at least one of the milling unit (9) and the compressed-air setting device (8) are definable, and wherein the central controller (4) is configured to move and actuate at least one of the mobile robot (7), the milling unit (9) and the compressed-air setting device (8) in a controlled manner in accordance with at least one of defined machining positions and defined machining paths.

18. The processing device according to claim 12, wherein the optical detection device (3) comprises a plurality of cameras and/or laser detection devices.

\* \* \* \* \*